United States Patent
Max

(10) Patent No.: US 7,293,420 B2
(45) Date of Patent: Nov. 13, 2007

(54) ATMOSPHERIC MOISTURE HARVESTERS

(75) Inventor: Michael D. Max, St. Pete Beach, FL (US)

(73) Assignee: Marine Desalination Systems, L.L.C., St. Petersberg, FL (US)

(*) Notice: Subject to any disclaimer, the term of this patent is extended or adjusted under 35 U.S.C. 154(b) by 271 days.

(21) Appl. No.: 11/245,130

(22) Filed: Oct. 7, 2005

(65) Prior Publication Data

US 2007/0079624 A1 Apr. 12, 2007

(51) Int. Cl.
*F25D 17/06* (2006.01)
*F25D 21/00* (2006.01)
*F25D 221/14* (2006.01)

(52) U.S. Cl. .................. 62/93; 62/272; 62/285

(58) Field of Classification Search ............ 62/93, 62/272, 285, 278, 288, 291, 126, 404, 150; 165/66, 113; 210/143
See application file for complete search history.

(56) References Cited

U.S. PATENT DOCUMENTS

| | | | | |
|---|---|---|---|---|
| 3,818,718 | A * | 6/1974 | Freese .................... | 62/272 |
| 4,193,443 | A * | 3/1980 | Nanaumi et al. .......... | 165/66 |
| 4,429,545 | A | 2/1984 | Steinberg | |
| 5,031,411 | A * | 7/1991 | Gehring et al. .......... | 62/93 |
| 5,275,643 | A | 1/1994 | Usui | |
| 5,634,353 | A * | 6/1997 | Hallin et al. ............ | 62/476 |
| 5,704,221 | A * | 1/1998 | Lego .................... | 62/278 |
| 5,846,296 | A | 12/1998 | Krumsvik | |
| 5,857,344 | A | 1/1999 | Rosenthal | |
| 6,182,453 | B1 * | 2/2001 | Forsberg ................ | 62/125 |
| 6,289,689 | B1 | 9/2001 | Zakryk | |
| 6,349,563 | B1 | 2/2002 | Kinoshita | |
| 6,467,295 | B2 * | 10/2002 | Oh et al. ................ | 62/259.2 |
| 6,497,107 | B2 * | 12/2002 | Maisotsenko et al. ...... | 62/121 |
| 6,581,849 | B2 | 6/2003 | Zhang | |
| 6,828,499 | B2 | 12/2004 | Max | |
| 6,945,063 | B2 | 9/2005 | Max | |

FOREIGN PATENT DOCUMENTS

| | | |
|---|---|---|
| CN | 1223325 | 7/1999 |
| DE | 3313711 | 10/1984 |

(Continued)

OTHER PUBLICATIONS

Zweibel, Kenneth and Paul Hersch, "Basic Photovoltaic Principles and Methods," PV Support Equipment, Van Nostrand Reinhold Company Inc. (New York), (1984) pp. 171-173.

*Primary Examiner*—Mohammad M. Ali
(74) *Attorney, Agent, or Firm*—Kenneth M. Fagin, Esq.; Novak, Druce & Quigg, L.L.P.

(57) ABSTRACT

Improved apparatus and methods for use in atmospheric moisture harvesters are disclosed. In particular, sectored or zoned cooling/condensation surfaces to optimize cooling efficiency are disclosed. In one embodiment, cooling is provided by dual-refrigerant, buffered cooling cells. In another embodiment, cooling is provided by thermoelectric cooling devices. Where thermoelectric cooling devices are used, an airway duct that covers both the cool side and the warm side of the devices can be provided, such that an airflow system that is driven by the difference in density between cooled, de-moisturized air and warmed air is established. Localized temperatures and moisture levels are monitored so that cooling can be adjusted as necessary to provide optimal, most energy-efficient condensation of moisture.

7 Claims, 6 Drawing Sheets

FOREIGN PATENT DOCUMENTS

| | | |
|---|---|---|
| DE | 3541645 | 6/1987 |
| DE | 003936977 | 5/1991 |
| DE | 19632272 | 2/1998 |
| DE | 10154351 | 5/2003 |
| ES | 2156707 | 7/2001 |
| FR | 2509023 | 1/1983 |
| GB | 2 376 401 | 12/2002 |
| JP | 09099201 | 4/1997 |
| JP | 2000-296392 A * | 10/2000 |

* cited by examiner

US 7,293,420 B2

ATMOSPHERIC MOISTURE HARVESTERS

GOVERNMENTAL SUPPORT AND INTEREST

This invention was made with Governmental Support under Contract Number N00014-05-C-0378 dated Sep. 14, 2005 and issued by the Office of Naval Research (ONR). The Government has certain rights in the invention.

FIELD OF THE INVENTION

The invention relates to atmospheric moisture harvesting. More particularly, the invention provides improved apparatus and methodologies that can be used with moisture harvesters as disclosed in U.S. Pat. Nos. 6,828,499 and 6,945,063, the contents of both of which are incorporated by reference in their entirety.

BACKGROUND OF THE INVENTION

According to the two patents incorporated by reference above, modest amounts of water (e.g., at least sustenance levels) can be obtained by condensing moisture from the atmosphere. The '499 patent discloses an apparatus for doing so in which a cooling system is affixed to a photovoltaic panel. The photovoltaic panel converts light into electricity which powers the cooling system, and the cooling system cools the panel so that moisture condenses on a condensation surface thereof. The '063 patent discloses an apparatus in which an energy-gathering member is spaced from a condensation surface so as to define an airway. A cooling system is powered by the energy-gathering member and cools the airway and/or the condensation surface such that moisture condenses on the condensation surface.

SUMMARY OF THE INVENTION

The present invention improves on the apparatus and methods disclosed in the '499 and '063 patents by providing for control of air movement and temperature at different places on the condensation surface. Air movement velocity and local temperatures on the condensation surface can be varied. These variables are controlled by on-board dedicated computers responding to built-in temperature and humidity sensors. Precise control of air movement and temperatures locally on the condensation surface optimizes conservation of energy used in condensation and prevents re-evaporation of condensed water. Airflow direction is managed by taking advantage of the changes in density of the air from which condensation is being effected. In one mode of operation, air that is exhausted from the condensation section is also heated to further improve gravity-driven airflow.

To achieve these benefits, according to the invention, the condensation surface of an atmospheric moisture harvester—for example, but not limited to, an atmospheric moisture harvester according to either the '499 patent or the '063 patent—is divided into a number of separate cooling zones or sectors. The sectors are controlled so that as moist air flows across the condensation surface, it encounters progressively cooler sectors and is progressively cooled. This results in optimal cooling and condensation by preventing over-cooling of the moist air (which wastes energy) or under-cooling of the moist air (which leaves moisture in the air that otherwise could have been collected).

In one embodiment, the cooling and condensation surface(s) is (are) constituted by a number of buffered cooling and condensation cells. The buffered cooling and condensation cells feature sealed containers with high-thermal-capacity refrigerant contained therein. Additional refrigerant is circulated through the cell in pipes immersed within the high-thermal-capacity refrigerant. This allows the chilling potential of the circulating refrigeration system to be well distributed to the surface on which condensation takes place.

In another embodiment, the cooling and condensation surface(s) is (are) constituted by arrays of thermoelectric cooling devices. Advantageously with this sort of embodiment, an air passageway may be established that wraps around the entire panel of thermoelectric devices so as to cover both the cooling side of a thermoelectric panel and the warming side of the thermoelectric panel. As the air is cooled and moisture condenses from it on the one side, the density of the air increases; as the air is warmed on the opposite side of the panel, the density of the air decreases. This increase and decrease in density may be capitalized upon to assist airflow through the system.

BRIEF DESCRIPTION OF THE DRAWINGS

These and other features of the invention will become clearer in view of the following description and the figures, in which.

DETAILED DESCRIPTION OF EMBODIMENTS OF THE INVENTION

Air that is cooled to remove water from it through condensation, where the air is not already fully saturated, must first be chilled to its dew point. Energy must be expended to cool the air without any water being produced. Therefore, the higher the relative humidity (at any temperature), the less energy will be expended in order to prepare the moist air for condensation. This initial cooling can be carried out relatively quickly and in a single step, although some condensation may take place as the moist air reaches its dew point temperature.

Condensation of water from fully water-saturated air, on the other hand, is most efficiently achieved when the air is neither over-cooled nor under-cooled. In order to accomplish condensation most efficiently following the cooling of the moist air to its dew point, the moist air should be cooled at such a rate—which varies for moist air at different temperatures—so that the energy expended in chilling the air and its constituent moisture, along with the additional cooling energy provided for condensation, provides for relatively continuous condensation.

Figure 1:
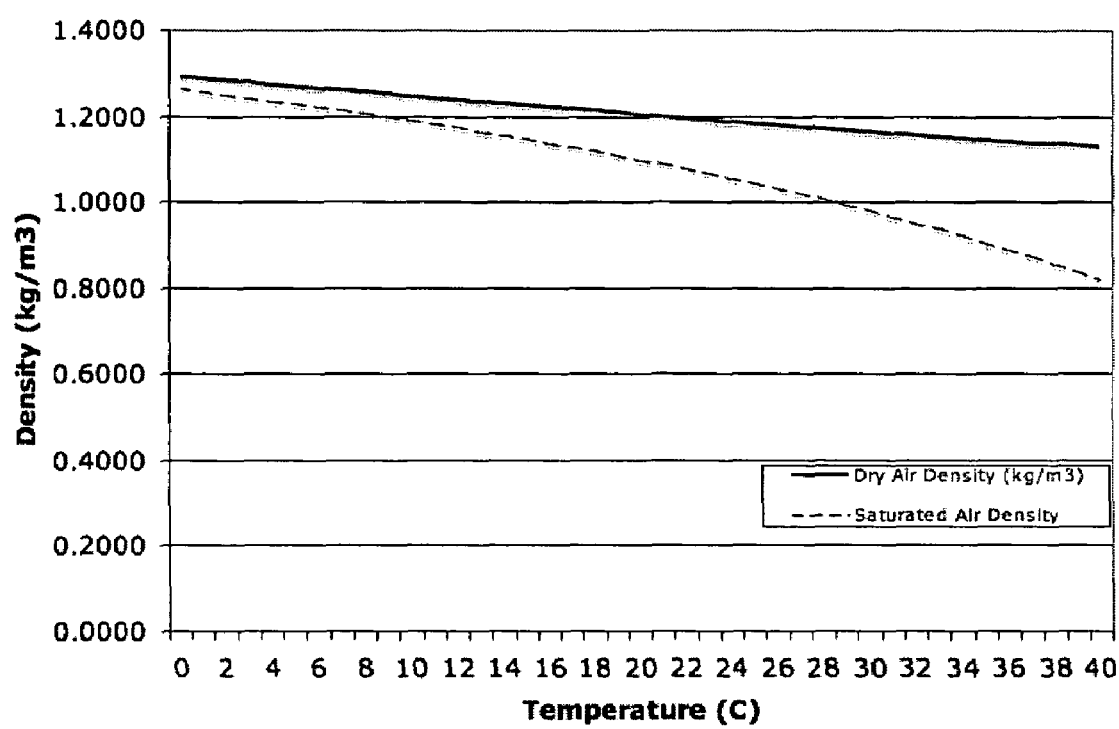
FIG. 1 is a graph of air density as a function of temperature for dry air and air that is saturated with moisture (such that continued cooling causes moisture to precipitate) at constant pressure (1 atmosphere)

Thus, in the course of atmospheric moisture harvesting, it is desirable to promote cooling in two main steps: first, a cooling step in which intake moist air is cooled to dew point; and second, a condensation step in which cooling is managed to promote efficient condensation. Condensation—i.e., the removal of water vapor from moist air through a chilling process that provides a heat sink, which causes liquid water to form as the temperature of the air decreases—increases the density of the moist air (FIG. 1). The combined effect of condensation and change of density of air can be managed to gain substantial benefit or energy economy.

Figure 2:
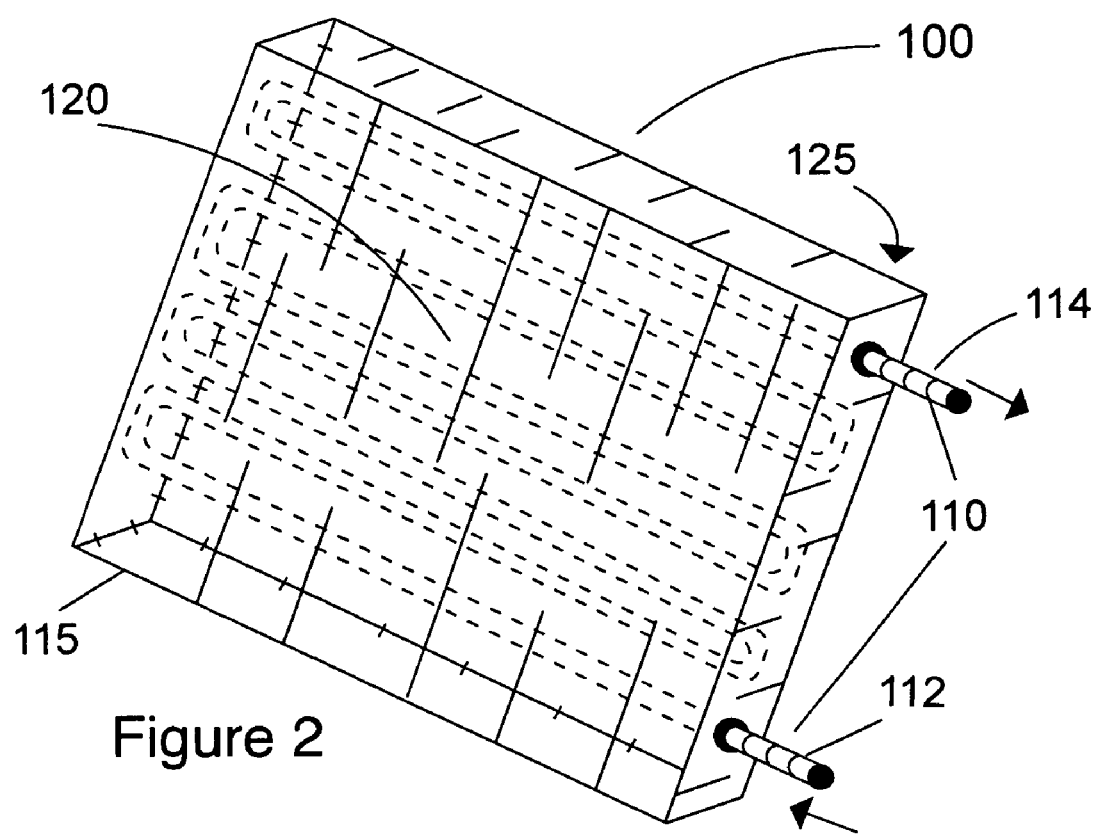
FIG. 2 is a schematic, perspective view of a buffered cooling/condensation cell.

FIG. 2 illustrates a buffered, circulating refrigerant condensation cell 100 that can be used to provide the cooling/condensation surface in any of the embodiments illustrated and described more fully in the patents incorporated by reference above. The condensation cell 100 is composed of a sealed container 115 that contains high thermal capacity fluid such as ethylene glycol (a standard coolant), which functions as a "buffering" refrigerant. The cell further includes a circulating refrigerant system 110 that introduces chilled refrigerant from 112 and returns it to 114 a condenser or other system (not illustrated) that prepares the refrigerant for reintroduction into the cell 100. The high thermal capacity refrigerant within the sealed container distributes the chilling in the sealed container in the immediate vicinity of each section of the circulating refrigerant system 110 and to the condensation surface 120. Although all sides of the sealed container could be used for condensation, in practice, only the front face 120 and possibly the back face 125 are used for condensation.

When refrigerant is circulated through the system 110 at a rapid enough rate, the temperature within the circulating system within each cell of a buffered condensation system remains relatively constant throughout, and the entire condensation surface is maintained at about the same temperature.

Alternatively, the circulating refrigerant may be introduced into the sealed container 115 in such a manner that cooling may be more pronounced in only part of the container and the condensation surface. Because the temperature of the buffering refrigerant will reflect the temperature of the refrigerant in the nearby parts of the circulating system 110, a cooling gradient may be established across the condensation surface 120 where a slow enough rate of circulation within the circulating system is established. This causes the refrigerant in the circulating system 110 to provide extensive cooling to the buffering refrigerant nearest to where the circulation system 110 enters the sealed container 115. As the temperature of the refrigerant in the circulating system rises owing to heat exchange with the buffering refrigerant, the temperature of the buffering refrigerant in the immediate vicinity of the downstream circulating system will reflect this lower cooling potential. The result of slow moving circulating refrigerant warming as it moves through the sealed container is that the temperature of the buffering fluid will vary proportionally to the temperature within the circulating system. Because the temperature of the buffering coolant will vary, the temperature of the condensation surface also can be varied so that it is increasingly warmer from the input toward the output of the circulating refrigerant system. The temperature gradient within the buffering coolant can be maintained because the warmer buffering coolant will naturally remain above cooler buffering coolant because of slight differences in density. Introducing the circulating refrigerant near the base of the condensation surface and allowing it to pass upwardly through the heat exchanger pipes within the buffered refrigeration cell toward the top achieves this gradient. It will become progressively warmer toward the top, near its exit point.

Figure 3:
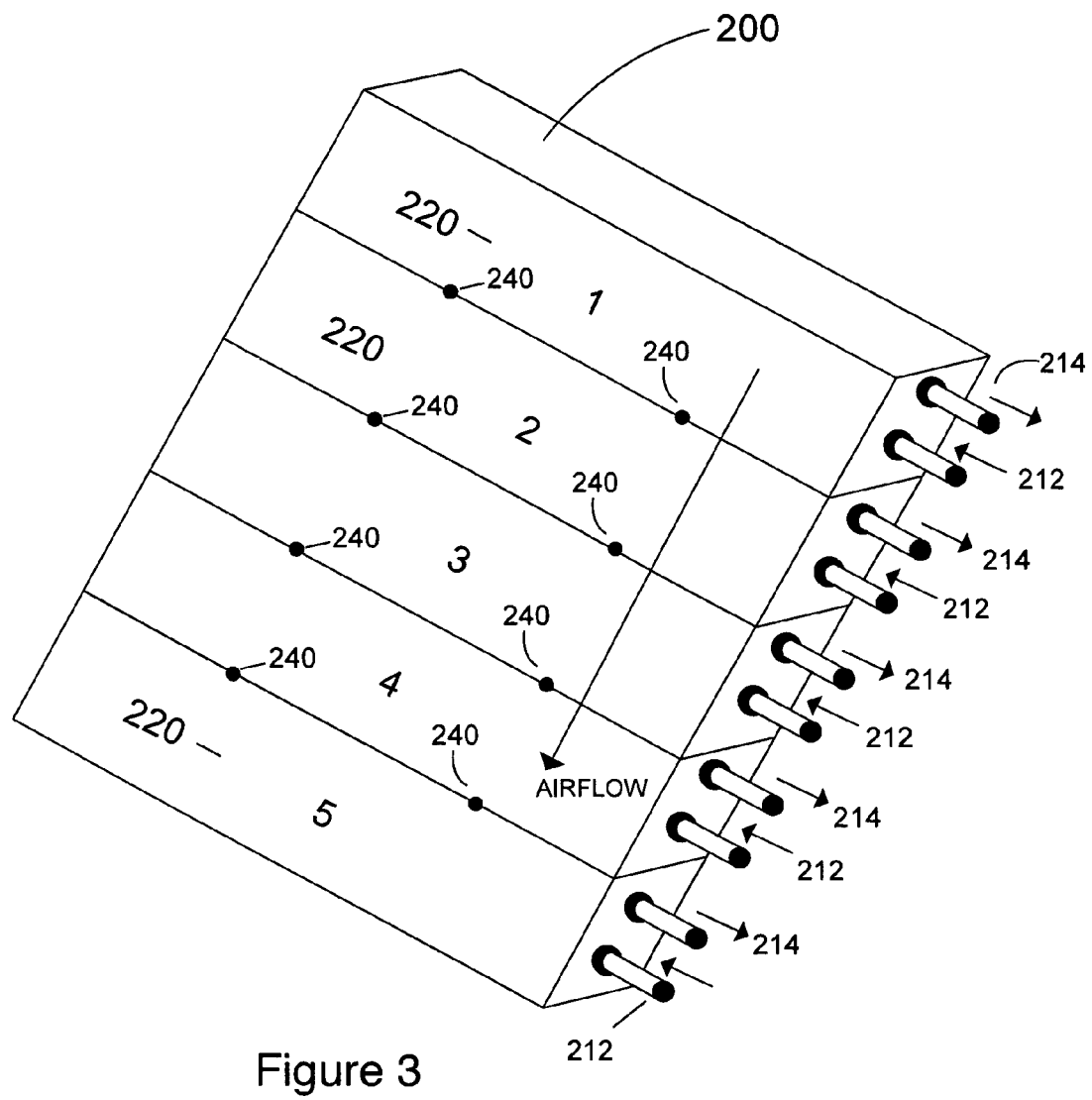
FIG. 3 is a schematic, perspective view of an array of buffered cooling/condensation cells as shown in FIG. 2, which together form a sectored or zone cooling surface.

When a number of these sealed condensation cells are placed side by side as illustrated in FIG. 3, they form a unit 200 with an essentially planar surface across which temperature can be varied. (Five cells are shown only for example of the relative location of multiple cells. No specific number of cooling cells is specified or required; the number of cells could be greater or less than the five illustrated in FIG. 3.) Moist air is passed with a minimum of turbulence across the surface of each condensation cell 220-1 through 220-5, each of which is composed of a circulating refrigerant system that introduces refrigerant 212 to each cell and returns it from each cell 214 to a compressor and condenser or other system (not illustrated) that prepares the refrigerant for vaporization and reintroduction to each cell. Each cell constitutes a different cooling "sector" of the entire condensation surface. Each cell or sector can be maintained at a different temperature or a different range of temperatures. Thus, as air moves in one direction across the array of refrigeration cells, it moves successively from the influence of one cooling cell to slightly cooler cells. Where the temperature of each cooling cell is maintained at a lower temperature than the adjacent cell across which the air has previously passed, the effect on the air is that it is gradually cooled.

Circulating refrigerant can be provided in several manners. In one mode, where the circulating refrigerant is provided to the entire set of cells in a single system, the refrigerant is provided first to the last cell the moist air flows over (for example, 220-5). From this cell 220-5, the exiting fluid 214 passes into the next cell (220-4) that is upstream to airflow, as at 212, and then successively to each of the other upstream cells.

Because it is desirable to cool the air to dew point as early as possible (i.e., by action of the first cell 220-1) to affect the airflow, it may be appropriate to operate the distribution of circulating refrigerant in another mode in which two or more separate sets of circulating refrigeration systems operate off the same condenser or heat sink (not illustrated). In that case, the circulating refrigerant inputs and outputs for each cell in the array of cells would be connected on one or more condensing/cooling systems such that more than one circulating refrigerant system can be established in which the cooling potentials are different.

Alternatively, in a third mode, where different temperatures or rate of refrigerant circulation are required, separate condensers/heat sinks may be required along with a number of completely separated circulating refrigerant systems. Even though some over-cooling may take place at the top of each successively lower condensation surface compartment, there will be no opportunity for the airflow to encounter warmer temperatures during its flow (which would have the effect of decreasing overall efficiency).

The preferred mode for environment surface controlled condensation is obtained when the airflow passes across an increasingly colder surface. Different cooling of the cells in the direction of the airflow offers the potential for the maintenance of relatively continuous condensation.

In the first instance, over the first cooling sector associated with the first cooling cell encountered by the moist air (i.e., cell 220-1), the moist air undergoing treatment may be cooled as rapidly as possible to the dew point temperature at which water vapor super-saturation is reached. At this point, further cooling will initiate condensation. Further condensation will progress in direct proportion to the amount of subsequent cooling provided. Across the range of cells or sectors 220-2 through 220-5, cooling is controlled so that the condensation surface of each successive cell is lower temperature in the direction of airflow. This allows for a gradual cooling and also provides the time for diffusion of water molecules toward the condensation surface so that relatively uniform removal of water vapor from the moist air is achieved.

Constant monitoring of air temperatures and the degree of water vapor saturation in the direction of airflow across the face of a sectored controlled condensation surface, combined with pre-computed parameters for optimal condensation across a range of temperatures, is recommended to control temperatures to achieve the most energy-efficient condensation. This monitoring is used to control airflow and cooling temperatures and the relative cooling gradient of the sector array to provide the most efficient condensation. So long as airflow moves consistently over colder condensation surfaces in the direction of its flow, there is no opportunity for air to pass across warmer temperatures, which has the effect of minimizing re-evaporation.

Figure 4:
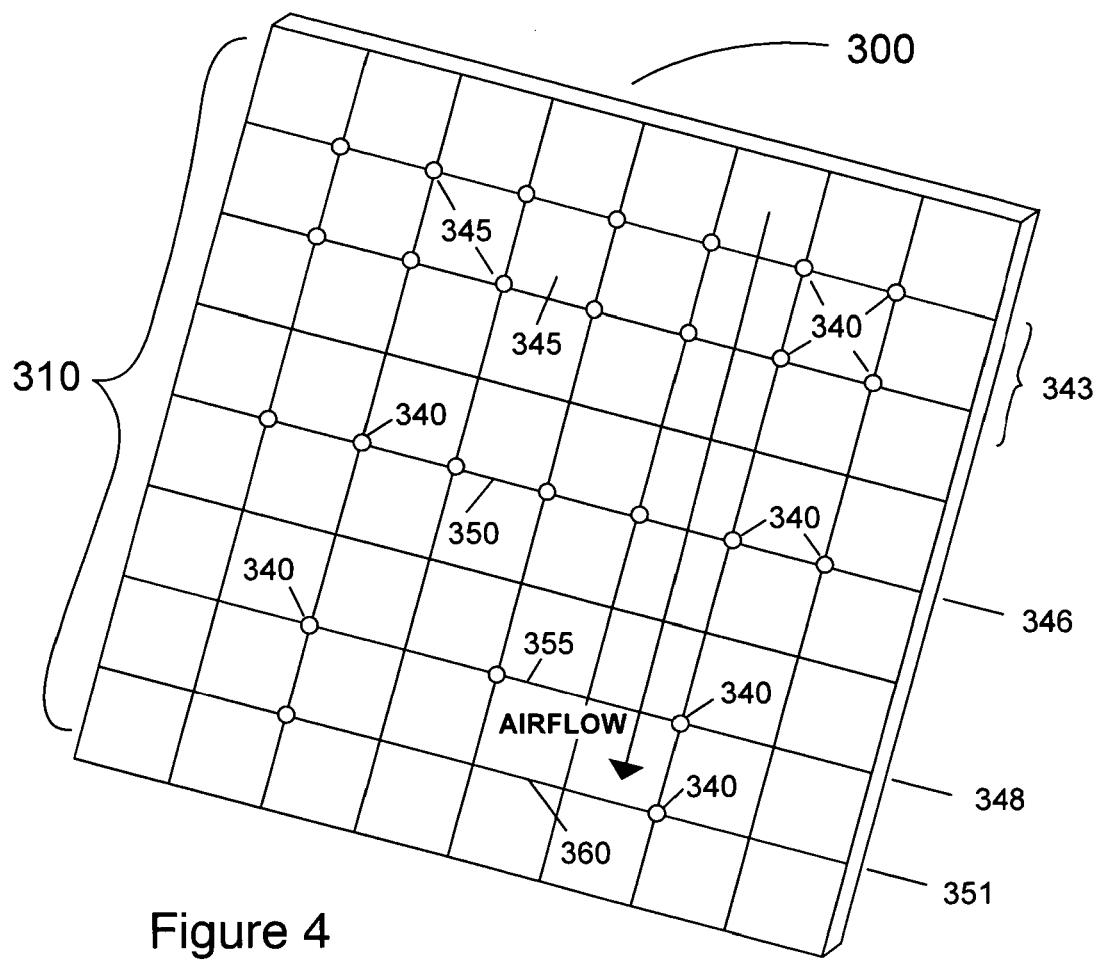
FIG. 4 is a schematic, perspective view of a cooling panel formed from an array of thermo-electric cooling devices (TEC's), which together form another embodiment of a sectored or zone cooling surface.

According to another embodiment, arrays of thermoelectric cooling devices (TEC's) are used to cool the condensation surface 300 (FIG. 4). As individual TECs can be made relatively small (down to 1 cm across), relative to the buffered chilled cells (FIGS. 2 & 3), sectored arrays 310 can include a much larger number of cells. These can be cooled so that smaller differences in temperature occur between adjacent cells, which yields the effect of a gradual, almost continuous drop in temperature in a chosen direction. Alternatively, in cases where a rapid through-put of moist air is desired, groups of these cells can be cooled similarly, which can yield chilling sectors that are the same relative size as those in a sectored circulating system as illustrated in FIG. 3, which results in larger sector zone condensation. Use of thermoelectric chilling has the potential to allow temperature to be varied to the precise temperature required for optimal condensation and the temperatures altered much more rapidly than in a buffered circulating flow system. This is important where the intake air has variable humidity and temperatures can be modified to meet any changes in cooling requirements.

The adaptive temperature variation made possible through sector or zone cooling/condensation requires constant monitoring of two-dimensional temperature data from the condensation surface using temperature and humidity sensors. These sensors 240 (FIG. 3) or 340 (FIG. 4) are installed at the junction of cooling cells so to minimize interference with cooling. On a buffered chilled sector condensation system (FIG. 3), only a few sensors 240 are required because the individual condensation cells are relatively large. On a TEC-chilled sector system (FIG. 4), the integrated or combined sensors 340 can be disposed at the junction of every chilling cell across the airflow, as illustrated in section 343. Alternatively, fewer sensors can be used, for instance by inserting them at only every other junction of rows of chilling cells, as illustrated in section 346. Further, fewer sensor locations across the airflow can be established by using every other junction between chilling cells across the airflow, as illustrated at section 348, or even at wider spacing as at section 351.

These sensors are placed by any one of a number of recognized methods on the condensation surface. In one embodiment, compound sensors are fabricated on small substrates and integrated into the surface of the panel to measure air relative humidity, air pressure, and temperature. These are emplaced on the surface in such a manner that they do not impede the temperature changes induced on the chilling surface. This can be achieved by their (and their connector wiring) being very small or by their being highly thermally conductive, or both. In another embodiment, the sensors are not compounded onto a single chip or sensing area but are separated, some (such as the cooling surface temperature sensor) being embedded within or below the chilling surface while the air sensors reside on or above the chilling surface. The air sensors may be separate or compounded (not shown, well understood micro-electronics).

These onboard sensors may be fabricated from thin film resistance temperature detectors (RTDs) temperature sensors, fiber optic, thin-film chips, or other appropriate technologies. These may be fabricated on a narrow roll of tape and subsequently applied to the condensation surface, or they could be crystallization-deposited directly on the surface at or near the junctions between sectors. These sensors will enable optimal condensation by indicating where to adjust the cooling to areas where it is most needed. Similar to other microelectronic technology, these sensors are connected with extremely small wires to temperature signal conditioning and recording electronics. Alternatively, a radio frequency wireless signal (similar to a radio frequency identification device (RFID), which is a device for remotely storing and retrieving data using devices called RFID tags or transponders) could be employed to receive and respond to the transceiver wirelessly using a very low power signal, and thereby transmit the sensor signal to the temperature signal conditioning and recording electronics. Further, the connections could be made through the cooling surface and connect to an embedded circuit or a circuit within the crystallized chilling surface.

The data from the sensors allows the system to distribute chilling for cooling of air to dew point and then for condensation, and promotes condensation at a near uniform rate across the sectored condensation surface. A network of sensors allows for automatic control of chilling for optimal condensation and power use, especially where TECs are used. On a buffered heat exchange water harvester, sensors are required with enough spread on each compartment to govern the rate and temperature of circulating fluid injection. On a TEC-chilled surface, where there is liable to be a higher degree of local control of temperature possible, a greater number of sensors in the distributed sensor system may be used.

In the course of removing moisture from air by condensation, the density of air changes. The invention utilizes these changes in density to provide for the controlled movement of air over the condensation surface. This allows for conservation of energy so that even when air has to be mechanically assisted in its movement (e.g., with fans, as disclosed in the patents incorporated by reference), the requirement for this mechanical assistance can be minimized. In another aspect, this invention takes advantage of the natural tendency for air undergoing condensation to increase in density. In a further and particular mode of operation, advantage is also taken of the natural tendency for air to decrease in density as it is warmed. These changes are capitalized upon so as to achieve desired airflow immediately adjacent to the condensation surface through gravity-driven processes. This has the benefit of achieving maximum condensation for any particular application of energy.

In particular, dry air is denser than air that is saturated with water vapor at all temperatures above freezing (FIG. 1, Eq. 1). This is due to a molecular displacement effect. When air absorbs water vapor (at constant pressure), the water molecules (molecular weight 18 g/mol) displace the components of natural air, which are primarily nitrogen (molecular weight 28 g/mol), oxygen (molecular weight 32 g/mol), and carbon dioxide (molecular weight 44 g/mol) molecules. Therefore, the resultant mixture of molecules that includes an increasing number of water molecules (water vapor) up to the point of saturation renders any particular volume of air less dense. In addition, when a mass of air is cooled, it becomes denser as energy decreases and the molecules assume a closer proximity.

The density of water-vapor-saturated air is always greater at lower temperatures (FIG. 1). The density of moist air (kg/m3) is:

$$\rho = \frac{P_{dryair}}{R_{dryair} \cdot T} + \frac{P_{watervapor}}{R_{watervapor} \cdot T} \quad \text{(Eq. 1)}$$

where:
$\rho$=P/RT where $\rho$=air density (kg/m$^3$), P=air pressure (Pa), $P_{dryair}$=partial pressure of dry air (Pa), $P_{watervapor}$=partial pressure of water vapor (Pa), R=individual gas constant (J/kg*K), and T is temperature (K). The density of air is $\rho$.

and the individual gas constant R for dry air (Eq. 2) is:

$$R_{dryair} = 287.05 \ J/kg \ K \quad \text{(Eq. 2)}$$

and the gas constant for water vapor (Eq. 3) is:

$$R_{watervapor} = 461.495 \ J/kg \ K \quad \text{(Eq. 3)}.$$

As water vapor condenses from the air (at constant air pressure) as the air is chilled, the density of the moist air increases as water vapor pressure becomes a smaller component of the absolute pressure. Although some water vapor (mass) is removed from the air through the process of condensation, the overall density is more affected by temperature reduction and the density continues to increase.

As the air is cooled while water is condensed using any of the aforementioned/incorporated-by-reference condensation systems and increases in density, it will tend to sink. Once saturation is reached, continued cooling and continued extraction of water through condensation also result in density increase of the cooled air mass. Although the relative change in density of water-saturated air decreases proportionally with temperature decrease (FIG. 1), the effects of the density changes are additive at constant pressure and the impetus for downward airflow will be maintained.

An airway duct may be formed by the close proximity of multiple condensation surface cells or arrays of cells that have either one or two condensation surfaces, as described in U.S. Pat. No. 6,945,063. (This is particularly so with respect to buffered refrigerated condensation systems, where two or more buffered refrigeration cells (FIG. 2) or arrays of cells (FIG. 3) allow chilling to take place about equally on both sides.) As the air is chilled and water condenses, the air becomes denser and flows naturally downward through the airway duct in the condensation apparatus under the influence of gravity. This natural gravity-drive reduces the need for air to be forced through the apparatus. As the air undergoing condensation is moving downward under the influence of gravity, cooling within the apparatus should increase downwardly, i.e., in the direction of airflow (as illustrated in FIGS. 3 and 4).

Airflow in the immediate vicinity of a controlled cooling condensation surface may be unobstructed, as illustrated and described in U.S. Pat. No. 6,828,499. In this case, the condensing system would be open to the ambient air, which is moved naturally over it by wind or density differences in the air. In this case, moist air may approach the condensation surface from any angle and, upon cooling, condense water. Under conditions where wind is moving air in the vicinity of the condensation surface, however, considerable air may be cooled from which little condensation is gained owing to its unobstructed nature and movement of chilled air away from the condensation surface.

Therefore, in order achieve more efficient extraction of water from moist air, a volume of moist air should be separated from the ambient air while it is undergoing progressive cooling. In this way, no or minimal heat transfer between the moist air undergoing condensation and the ambient air will take place, and no or minimal energy used for cooling the condensation surface will be wasted by cooling of air from which no condensation will be gained. If a cooling/condensing system such as that illustrated in U.S. Pat. No. 6,828,499 is used, separating the air undergoing condensation may be achieved during periods of time when light is not being gathered and the surface is being used for condensation by temporary establishment of a physical barrier upon which no condensation is intended to take place at a distance from the condensation surface. The sides are also closed in with a physical barrier that may be made from the same material (fabric, plastic, or metal) so that a closed airway is established. This allows the airflow of the volume of air to be constrained in the immediate vicinity of the condensation surface, which results in an airway similar to that where two or more condensation cells or groups of cells are placed facing each other, as in U.S. Pat. No. 6,945,063.

A volume of moist air is thus separated from the ambient air and brought for treatment within the condensation apparatus by an air duct that forms an airway. This process of separation of the air-to-be-treated from ambient air is desirable until condensation of that ingested air has been completed so that no or minimal thermal interaction takes place with ambient air that does not lead directly to condensation. Furthermore, it may be desirable to leave some moisture in the effluent air from the condensation apparatus because condensation at lower temperatures requires a degree of cooling that may be difficult or more expensive to produce, owing to heat losses, and in cooler air there is a smaller volume of water vapor to be condensed (FIG. 1). Provision of an airway open only at its intake and exit ends assures that no air is cooled from which moisture is not condensed and that the temperature of that volume of air can be carefully controlled through sector chilling so as to extract the most water for any application of energy used to artificially chill.

In other configurations of controlled environment condensation apparatus, for instance as illustrated in U.S. Pat. No. 6,945,063, a permanent or semi-permanent air duct may be established after the apparatus has been transported to its operation location. Where any condensation apparatus is intended for prolonged use at a particular location, a more permanent air duct may be established. Where portability, rapid deployability, and a requirement for easy repacking exist, however, the air duct may be constructed as a temporary air duct that may be folded or rolled for transport. This temporary air duct may be an integral part of the condensation surface or demountable and packed separately where very lightweight condensation apparatus is desirable, for instance, to be used with apparatus as described in U.S. Pat. No. 6,828,499.

Bringing known volumes of air into contact with the condensation panel in a ducted manner facilitates the moist air being progressively dehumidified under controlled environmental conditions, even where conditions are windy (which otherwise would cause the condensation to operate very inefficiently because large volumes of air would be chilled from which little moisture might be condensed). To facilitate more efficient operation, the airflow ducting should be configured to take advantage of the density changes caused during cooling and condensation so that air moves through the apparatus as a direct result of the cooling and controlled condensation process.

Both a buffered cooling/condensation system with circulating refrigerant (FIGS. 2 and 3) and a TEC-based system (FIG. 4) produce heat, which has to be dissipated in some fashion. In a buffered refrigeration unit, the condenser or condensers are separate from the condensation system and are connected to the condensation system by the pipes containing circulating refrigerant and control and sensor electronic wiring. In the case of a buffered refrigeration system, waste heat within the pipes may used to heat water or any other material that requires warming, where this is preferable to dissipation of the heat, but no waste heat is generated in the immediate vicinity of the condensation apparatus.

A TEC-based condensation system, on the other hand, produces heat in the immediate vicinity of the condensation apparatus. Although this might appear initially to introduce a difficulty into the operation of a TEC-based condensation system, the manner in which the heat is produced provided means to influence the airflow in a TEC-based condensation apparatus.

A TEC device consists of two panels connected by electric circuitry that causes one panel to cool as the other heats proportionally. In cases where a TEC is used to chill and rapid cooling is required, a heat sink of some sort has to be provided for the removal of heat from the warm side of the TEC. (In the case of moisture harvesters as per the invention, the cold side of the TEC is the surface upon which condensation is carried out.) This heat sink is often a circulating fluid system in which rapid temperature fluctuation is not possible. According to the invention, the warm side of the TEC is also used to help move air through the apparatus.

Figure 5:
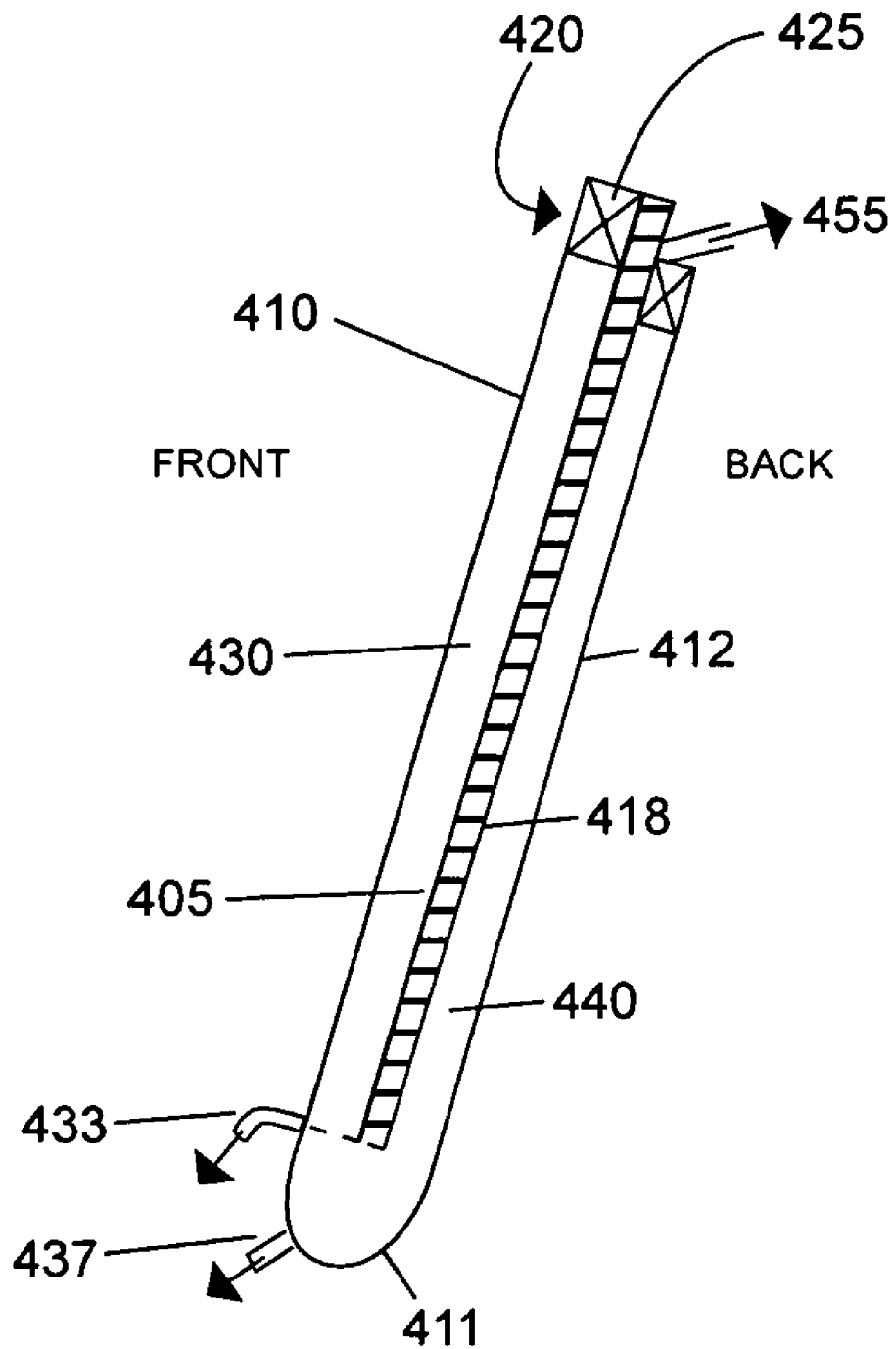
FIG. 5 is a schematic section view of a ducted, TEC-based cooling/condensation panel.

In an apparatus as illustrated in FIG. 5, a continuous air duct 410 is established over the front, chilling side 405 of a TEC-based cooling and condensation panel. This air duct continues around the bottom of the panel 411 and over the back side of the panel as at 412, on which back side 418 heating of the air takes place. This continuous air duct 410/411/412 utilizes gravity to assist air movement through it on both the condensation side 405, where density of the moist air increases downwardly as the air is cooled and becomes less humid such that the drive is downward, and on the heating side 418, where air is warmed and becomes less dense such that the drive is upward. This continuous front and back airway makes the best use out of heat that would otherwise be wasted.

Moist air flows in at the top 420 of the condensation system airway, where some light fans 425 may be placed to assist with airflow (for instance at startup or when conditions are windy). Air flows downward through the airway 430 facing the condensing surface and grows more dense as it is chilled and as water is extracted from it. Condensed water is removed at one or more locations at the base of the condensing section 433 or at the lowest point 437 in the apparatus, to which water will naturally flow.

The air then turns at the base of the apparatus and moves upward through the exhaust airway 440 between the air duct 412 and the warm side 418 of the TEC panel. As the air is warmed by the warm side of the TEC panel at the back of the apparatus, the density of the warming air naturally diminishes, and the air buoyantly rises upward. The warming introduces positive buoyancy to the air as it moves up through the airway and thus imparts suction to the airway as a whole. This helps to move the air through the combined airway, drawing it down at the bottom of the condensation airway section 405 and drawing the treated air upward at the uppermost part of the warming section 440 at the back of the airway, where it leaves the apparatus 455. (Warming of the air in the exhaust airway 440 not only promotes the gravity-driven movement of air over the condensation surface, but it also enhances the electrical efficiency of the cooling of the condensation surfaces. The faster heat can be removed from the warm side of the circuitry, the cooler the cool side will be due to an electrical property of the Pelletier effect known as the "delta T".)

The surface on which condensations takes place operates most efficiently when it is at a steep angle, for instance between 85 and 60 degrees from vertical (FIG. 5). This efficiency is gained for two reasons.

First, the gravity-driven air vector on both the cooling and heating side of the TEC panel is vertical. Both the descending chilled air in the front airway and the rising warmed air in the back airway thus are deflected by the tilted TEC panel. This deflection introduces some turbulence that promotes unmixing of the water vapor that otherwise has to move toward the chilling surface entirely by diffusional means. The orientation of the condensation surface is thus maintained so that the gravity-driven airflow from which condensation is desired essentially presses itself onto the condensation and then the heating surface surfaces in turn. This deflection also prevents the establishment of a boundary layer of air between the condensation surface and the air moving in the airway that would act as an insulator and impede condensation. The incident angle of the warmed rising air against the panel also promotes good contact and will generally prevent the buildup of an inert air mass that could act as an insulator. As on the cooling side, where the air naturally moves on a vector that is incident to the cooling or condensation surface, the warming air that tends to rise vertically is also incident to the warming face of the TEC panel. Air from which moisture has been condensed exits near the upper part of the apparatus, from where it is deflected away 455 from more moist air on the intake side.

Second, gravity is also pulling the water vertically downward so that there is a tendency for the water to flow on the surface to water collection and removal tubes 433, 437 (FIG. 5). Where the water flows on the surface, a combination of hydrophobic and hydrophilic materials disposed so as to facilitate condensation and water collection, as described in U.S. Pat. No. 6,828,499, enhances the efficiency of water production through condensation. Hydrophilic areas are best for nucleation of the water drops on the cooling surface. Hydrophobic areas are best to allow the water to fall, or drip, down the cooling surface into a water storage area. It is desirable that the water drops be allowed to move into the water storage area as soon as possible after nucleation so that the cooling energy is not used to cool the liquid water on the face of the condensation surface.

Figure 6:
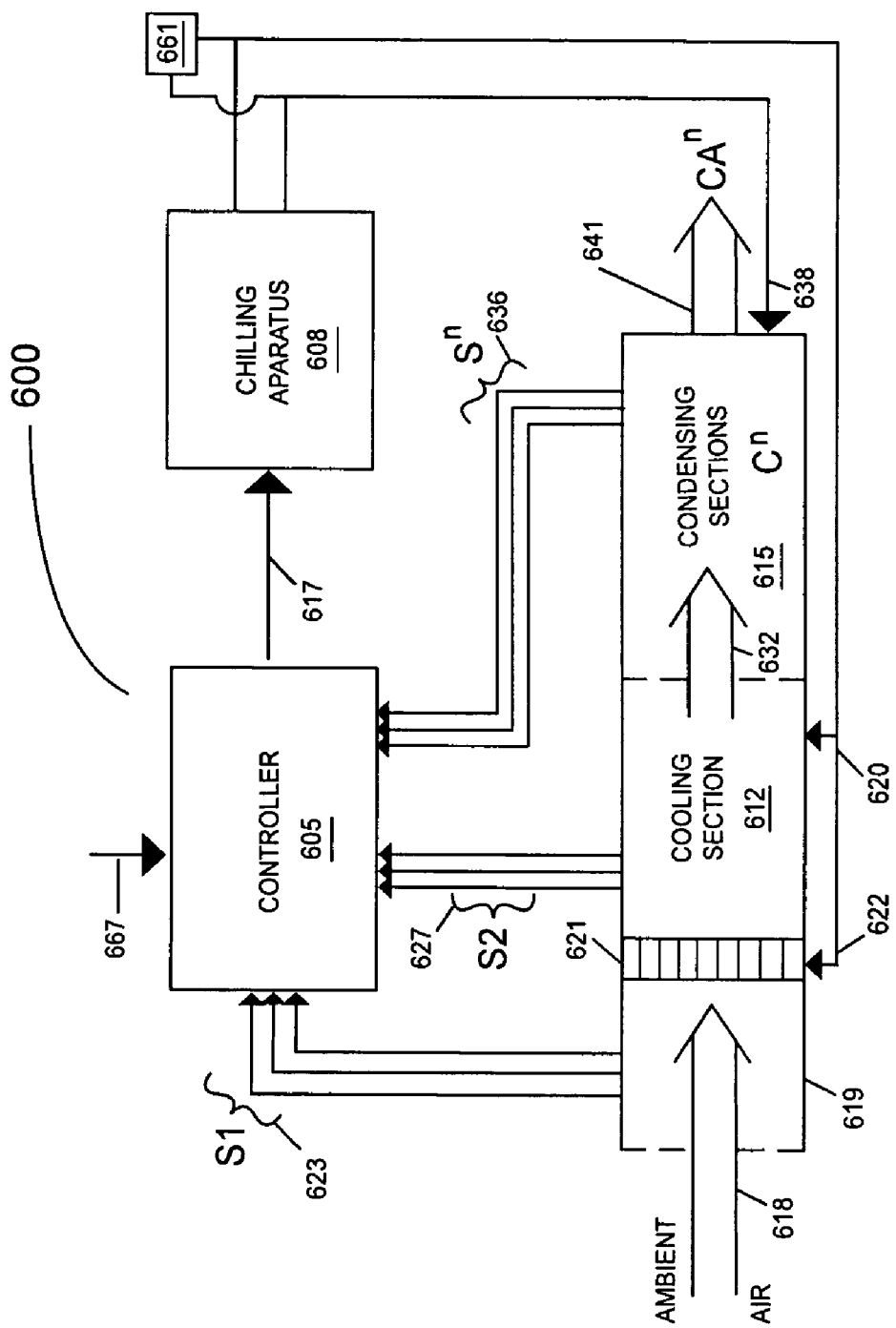
FIG. 6 is a schematic diagram of a control system used to regulate operation of an atmospheric moisture harvester according to the invention.

Control of the surface temperatures of the chilling surfaces (the surfaces on which initial cooling of ambient air occurs) and the condensation surfaces (the surfaces on which moisture condensation occurs) is maintained by a control system 600 (FIG. 6). The control system 600 includes a controller 605, which instructs the chilling apparatus 608 to deliver particular levels of chilling to the cooling sector or section 612 and a number of condensation sectors or sections 615. The cooling sector or section 612 is the section of the apparatus in which the source ambient air is cooled to dew point (for the local ambient conditions) or below dew point to cause condensation if the ambient air is suitably humid; the condensation sectors or sections 615 are the portions of the apparatus in which the air is further cooled so that as it passes through or across the apparatus, it is maintained right at, or at some level below, the precise, location-specific dew point temperatures to yield the most efficient condensation.

In general, the precise, location-specific dew point temperature will be the desired maximum set-point for the condensation surface temperature at any given location. The purpose of the control loop is to achieve the set-points in the cooling and condensation sections by controlling the levels of refrigeration, measuring the temperature at the surface, and comparing it to the command set-point. The difference in actual and desired temperature is the error signal. This signal can be used by industry-standard controls such as on-off controls or even current potentiometers. The controller then uses the input from the sensors and the temperature error signal to determine the correct DC voltage to power the refrigeration system chilling apparatus 608 (e.g., either the coolers/condensers of a circulating refrigerant system or the electrical system that controls the TEC array in a TEC-based system) to adjust the temperature closer to the set-point. The surface temperature sensors would report the change they saw and the loop will continue to calculate new error signals and adjust the temperatures to the set-points.

By using temperature, air pressure, and humidity sensors that provide real-time feedback to the controller 605, a closed-loop control system is established that allows precise, location-specific dew points to be calculated in the cooling section 612 and at each of the different condensation sections 615 using well known formulas. The controller 605 activates the chilling apparatus 608 through an electrical communication system 617 (hardwire or wireless) to provide specific levels of chilling 620 to the cooling section 612 and specific levels of chilling 638 to each of the condensation sections 615. (The cooling section 612 may be composed of multiple cooling cells, TEC elements, or other cooling devices, and the condensation sections 615 likely will be composed of multiple cooling cells, TEC elements, or other cooling devices. Therefore, although a single line is shown for each of chilling commands 620 and 638, it should be appreciated that that is a schematic representation only, and multiple commands may be sent to cooling section 612 and multiple commands will be sent to condensing sections 615.) The controller 605/chilling apparatus 608 may also send a command 622 to activate intake fans 621, if present, used to draw air into air intake 619.

Sensor array S1 623 measures the various parameters (temperature, pressure, and relative humidity) of the source ambient air 618 as it enters the water harvester. From those parameters, the controller 605 is able to calculate the local ambient dew point, and hence the level 620 to which the cooling section should be chilled. Sensor array S2 627 measures the initially processed air 632, which should be pre-chilled to the desired sub-dew point temperature, as it passes from the cooling section 612 into the first of the multiple condensation sections 615. This allows the controller to determine whether more or less chilling should be applied (via chilling command 620) in the cooling section 612. Subsequently, in each of the condensation sectors or sections C″ that comprise the condensation sections 615, sensor arrays S″ 636 measure the cooled/condensed air CA″ 641 as it passes across each sector or segment. This allows the controller to calculate local dew points for each of the locations on the condensation surfaces so that appropriate cooling commands 638 can be applied. It also allows the controller to determine whether more cooling should be applied (via chilling command 620) in the cooling section 612. (For each of the sensor arrays S1, S2, and S″, three sensor arrows are shown to represent the three parameters being measured, viz., temperature, pressure, and humidity; the single "bundle" of arrows represents schematically the measurements provided by all sensors in each of the overall arrays of sensors.)

A read-out 661 and a manual programming control 667 allow for manual over-ride or for manual operation in the case of sensor or closed control loop failure.

It will be appreciated that the foregoing figures and description are exemplary in nature and that various modifications to and departures from the disclosed embodiments will occur to those having skill in the art. For example, while this disclosure was introduced by reference to the '499 and '063 patents and the invention was described above as providing improved apparatus and methods that can be used with water harvesters as disclosed in those patents, it should be recognized that the apparatus and methods disclosed herein have broader applicability. For example, while water harvesters as per the '499 and '063 patents rely on photovoltaic cells or other energy-gathering members to drive the cooling systems described therein, sectored cooling/condensation surfaces or ducted TEC-based devices as described herein could be used in water harvesters that are powered by other means, e.g., line supply of electricity where that is available, batteries, or other means.

Thus, the invention that is the subject of this disclosure is set forth in the following claims.

I claim:

1. An atmospheric moisture harvester, comprising:
    a condensing surface on which atmospheric moisture condenses; and
    a control system configured and disposed to control cooling of said condensing surface;
    wherein said condensing surface is subdivided into a plurality of sections or sectors the cooling potential of which are individually controlled by said control system, whereby an increasing cooling gradient is established from one end of said condensing surface to another end of said condensing surface.

2. The atmospheric moisture harvester of claim 1, wherein said condensing surface includes an initial, pre-cooling or chilling section and subsequent moisture-condensing sections.

3. The atmospheric moisture harvester of claim 1, wherein said condensing surface comprises a plurality of cells through which refrigerant circulates.

4. The atmospheric moisture harvester of claim 3, wherein said cells comprise buffered cooling and condensing cells.

5. The atmospheric moisture harvester of claim 1, wherein said condensing surface comprises a plurality of thermoelectric cooling devices.

6. An atmospheric moisture harvester, comprising:
    a condensing member having first and second sides, said first side providing a condensing surface against which atmospheric air is cooled such that moisture condenses therefrom, said condensing member releasing heat from said second side; and
    a continuous air passage that extends along both said first and second sides of said condensing member.

7. A method of obtaining moisture from atmospheric air, comprising:
  cooling said atmospheric air approximately to or below dew point for local ambient conditions; and
  further cooling said atmospheric air through a series of steps or gradations to condense atmospheric moisture therefrom, wherein said further cooling is controlled in each of said steps or gradations such that said atmospheric air is cooled approximately to or to the precise, location-specific dew point temperatures associated with each of said steps or gradations.

* * * * *